US008306762B2

(12) United States Patent
Sonnier

(10) Patent No.: US 8,306,762 B2
(45) Date of Patent: Nov. 6, 2012

(54) SYSTEMS AND METHODS FOR ANALYSIS OF DOWNHOLE DATA

(75) Inventor: William Joshua Sonnier, Lafayette, LA (US)

(73) Assignee: Baker Hughes Incorporated, Houston, TX (US)

( * ) Notice: Subject to any disclaimer, the term of this patent is extended or adjusted under 35 U.S.C. 154(b) by 432 days.

(21) Appl. No.: 12/693,025

(22) Filed: Jan. 25, 2010

(65) Prior Publication Data
US 2011/0184567 A1    Jul. 28, 2011

(51) Int. Cl.
*G01F 1/00* (2006.01)
*G01F 15/00* (2006.01)
*G01D 21/00* (2006.01)
*G06F 19/00* (2011.01)
*G06F 17/40* (2006.01)

(52) U.S. Cl. ............ 702/45; 73/198; 73/865.8; 137/2; 702/1; 702/127; 702/187; 702/189

(58) Field of Classification Search .......... 73/152.01, 73/152.18, 152.29, 198, 432.1, 861, 865.8; 137/1, 2, 551; 700/1, 90, 299, 301, 304; 702/1, 33, 45, 50, 127, 182, 187, 189; 708/100, 708/105, 200; 714/699, 746, 747
See application file for complete search history.

(56) References Cited

U.S. PATENT DOCUMENTS

| | | | | |
|---|---|---|---|---|
| 2,917,066 | A | * | 12/1959 | Bergson ............... 137/101.19 |
| 3,173,003 | A | * | 3/1965 | Muller-Girard ............ 708/843 |
| 4,290,313 | A | * | 9/1981 | Appel et al. ............. 73/861.17 |
| 4,661,701 | A | | 4/1987 | Grau |
| 4,697,078 | A | | 9/1987 | Randall |
| 4,928,251 | A | * | 5/1990 | Marzalek et al. ............ 702/67 |
| 5,105,080 | A | | 4/1992 | Stoller |
| 5,360,975 | A | | 11/1994 | Stoller |
| 5,600,135 | A | | 2/1997 | Jacobson |
| 6,343,507 | B1 | | 2/2002 | Felling |

(Continued)

FOREIGN PATENT DOCUMENTS

JP    2004-151065 A  *  5/2004

OTHER PUBLICATIONS

McKinley et al., The Structure and Interpretation of Noise from Flow Behind Cemented Casing, Journal of Petroleum Technology, pp. 329-338, Mar. 1973.

(Continued)

*Primary Examiner* — Edward Cosimano
(74) *Attorney, Agent, or Firm* — Law Offices of Mark L. Berrier

(57) ABSTRACT

Systems and methods for analysis of data associated with fluid flow through a conduit and potential control of the fluid flow. In one embodiment, a method includes a data processing unit obtaining from a sensor a signal representing a series of measurements of a physical parameter associated with fluid flow through the conduit. The data processing unit performs singular spectral analysis of this signal and thereby identifies recurring, possibly non-sinusoidal patterns in the signal. The data processing unit may construct a second signal from some or all of the recurring patterns identified in the first signal. Alternatively, the data processing unit may identify recurring patterns in the signal which are indicative of corresponding conditions associated with the fluid flow through the conduit. The data processing unit may then initiate control functions responsive to the recurring patterns and associated conditions.

8 Claims, 5 Drawing Sheets

U.S. PATENT DOCUMENTS

| | | |
|---|---|---|
| 6,412,354 B1 | 7/2002 | Birchak |
| 6,763,883 B2 | 7/2004 | Green |
| 6,871,148 B2 | 3/2005 | Morgen |
| 7,084,392 B2 | 8/2006 | DiFoggio |
| 7,197,195 B2 | 3/2007 | DiFoggio |
| 7,210,343 B2 | 5/2007 | Shammai |
| 7,362,422 B2 | 4/2008 | DiFoggio |
| 7,398,159 B2 | 7/2008 | Venkataramanan |
| 7,458,257 B2 | 12/2008 | Pop |
| 7,497,256 B2 | 3/2009 | DiFoggio |
| 7,523,002 B2 | 4/2009 | Griffiths |
| 7,577,528 B2 | 8/2009 | Li |
| 2008/0037006 A1 | 2/2008 | Canas Triana |
| 2009/0016725 A1 | 1/2009 | Chouzenoux |
| 2009/0082981 A1* | 3/2009 | Muto ............................ 702/77 |
| 2011/0238719 A1* | 9/2011 | Hanusse ...................... 708/270 |
| 2011/0294453 A1* | 12/2011 | Mishali et al. ............... 455/293 |

OTHER PUBLICATIONS

Pennebaker et al., The Temperature-Sound Log and Borehole Channel Scans for Problem Wells, 52nd Ann. Fall Tech. Conf. and Exhib. of the Soc. of Pet. Engrs., Oct. 9, 1977.

McKinley et al., Specialized Applications of Noise Logging, Journal of Petroleum Technology, pp. 1387-1395, Nov. 1979.

Koerner et al., Use of the Noise Log as a Downhole Diagnostic Tool, Middle East Oil Technical Conference of the Society of Petroleum Engineers, Mar. 25, 1979.

* cited by examiner

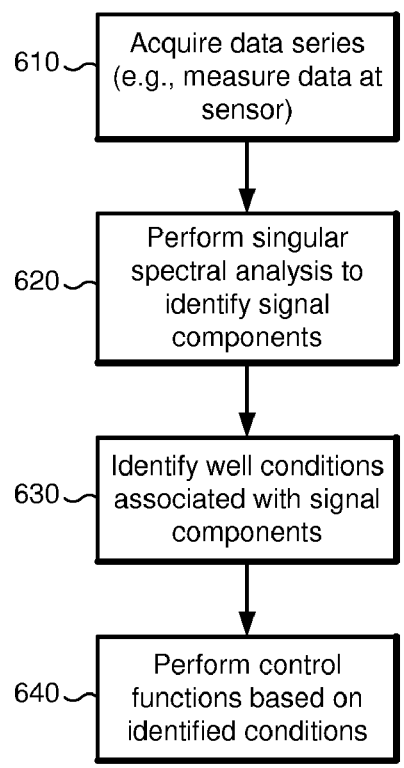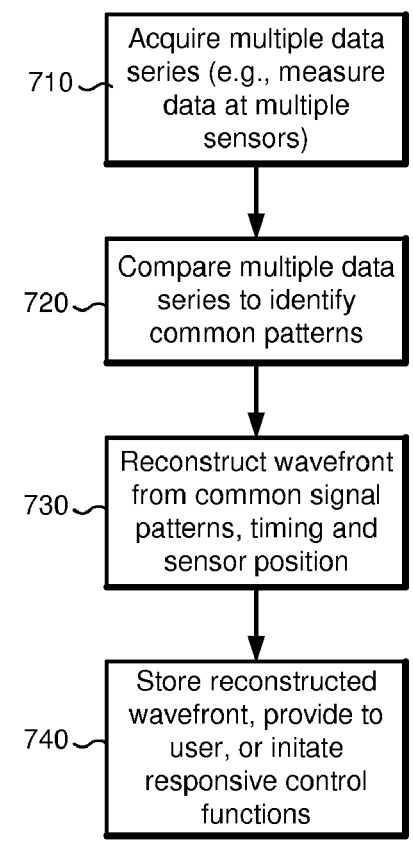
Fig. 6                                  Fig. 7

SYSTEMS AND METHODS FOR ANALYSIS OF DOWNHOLE DATA

BACKGROUND

1. Field of the Invention

The invention relates generally to systems and methods for analysis of downhole data, and more particularly to systems and methods for identifying recurring patterns in data signals and using these patterns to reconstruct all or part of the data signals or to trigger functions that control operation of the well or pipeline.

2. Related Art

Downhole data from oil wells is often measured and analyzed in order to identify various conditions and characteristics associated with operation of the well. The measured data may, for example, consist of temperature measurements or pressure measurements.

Pressure measurements are commonly used to determine the rate of flow of fluid through wells or pipelines. For instance, pressure measurements can be made at two points on a pipeline and then a flow rate can be computed from the pressure drop across the distance between the pressure sensors. The computation of a flow rate based on pressure measurements is a relatively simple matter if the fluid in the pipeline is flowing slowly and is well-behaved, but the computation becomes more complex if the fluid is experiencing more complex flow.

The computation of fluid flow based on measured data may be affected, for example, by such things as the composition of the fluid (e.g., combinations of oil and water or gas and water) and turbulence or other flow structures (conditions that affect the character of fluid flow through the well). Some analysis may therefore be performed on the measured data in order to identify flow structures that affect the computations and determinations that are based on the measured data. Once these flow structures are identified, conditions such as flow rates can be more accurately determined. It may also be desirable to identify particular flow structures that can cause damage to the well, pipeline, associated equipment or even the oil-producing structures.

Identifying flow structures in a well or pipeline may be difficult for a number of reasons. For instance, data may be taken at irregular intervals, there may be gaps in the data, or the data may be noisy, so any analyses of the data may be inaccurate. Further, conventional analyses typically focus on the identification of sinusoidal signal components and typically are not able to distinguish non-sinusoidal patterns that are associated with flow structures that may be present. It would therefore be desirable to provide systems and methods that overcome one or more of these problems.

SUMMARY OF THE INVENTION

This disclosure is directed to systems and methods for analysis of downhole data that solve one or more of the problems discussed above. In one particular embodiment, recurring patterns in data signals are identified and used to reconstruct all or part of the data signals or to trigger functions that control operation of the well or pipeline. Typically, a sensor provides a signal comprising a series of measurements of a physical parameter such as pressure which is associated with fluid flow through the well or pipeline (which may be referred to herein simply as a "conduit"). A data processing unit performs singular spectral analysis of this signal and thereby identifies recurring, possibly non-sinusoidal patterns in the signal. The data processing unit may construct a second signal from some or all of the recurring patterns identified in the first signal. Alternatively, the data processing unit may identify recurring patterns in the signal which are indicative of corresponding conditions associated with the fluid flow through the conduit, and then initiate control functions responsive to the recurring patterns and associated conditions.

Systems and methods for analysis of data associated with fluid flow through a conduit and potential control of the fluid flow. In one embodiment, a method includes a data processing unit obtaining from a sensor a signal representing a series of measurements of a physical parameter associated with fluid flow through the conduit. The data processing unit performs singular spectral analysis of this signal and thereby identifies recurring, possibly non-sinusoidal patterns in the signal. The data processing unit may construct a second signal from some or all of the recurring patterns identified in the first signal. Alternatively, the data processing unit may identify recurring patterns in the signal which are indicative of corresponding conditions associated with the fluid flow through the conduit. The data processing unit may then initiate control functions responsive to the recurring patterns and associated conditions.

One embodiment comprises a method for transforming a signal for a physical parameter associated with fluid flow through a conduit. In this method, a data processing unit obtains a series of measurements of a physical parameter associated with fluid flow through the conduit. The measurements form a first signal. The data processing unit performs singular spectral analysis (also referred to as empirical orthogonal function analysis or principal component analysis) of this signal and thereby determines recurring patterns in the signal. The recurring patterns may be non-sinusoidal patterns. The data processing unit then constructs a second signal from the recurring patterns identified in the first signal. The second signal may be a de noised version of the first signal that includes substantially all of the recurring patterns identified in the first signal. When the second signal is constructed, the recurring patterns may be used to fill gaps that existed in the first signal. The second signal alternatively may be constructed by superposition of only selected ones of the recurring patterns, effectively producing a filtered signal that is associated with selected conditions of the fluid flow through the conduit.

An alternative embodiment comprises a system having a sensor and a data processing unit, where the data processing unit is configured to receive a signal from the sensor representing a physical parameter of a conduit to which the sensor is coupled. The data processing unit is configured to perform singular spectral analysis of the sensor signal to determine recurring, potentially non-sinusoidal patterns in the signal. The data processing unit then constructs a second signal from the recurring patterns identified in the first signal. The second signal may include all of the recurring patterns, or only selected ones of these patterns. The system may include a data storage unit that can store the initial signal produced by the sensor and/or the second signal constructed by the data processing unit.

Another alternative embodiment comprises a method for controlling fluid flow through a conduit in response to detecting recurring patterns in a sensor signal. In this method, a data processing unit obtains a series of measurements (a first signal) of a physical parameter associated with fluid flow through the conduit. The data processing unit performs singular spectral analysis of this signal to identify recurring patterns in the signal. The recurring patterns may be non-sinusoidal. The data processing unit then communicates with a flow control unit in response to identifying signal components that are associated with particular fluid flow conditions. The flow control unit controls the fluid flow in the conduit in response to the communication from the data processing unit. The flow control unit may, for example, be a choke that changes the rate of flow of fluid through the conduit. Another embodiment may comprise a system including the sensor, data processing unit and flow control unit.

Numerous additional embodiments may also be possible.

The various embodiments of the invention may provide a number of advantages over prior art systems and methods. For instance, because coherent patterns in the data correlate to multiphase flow structures and turbulence geometries such as plug-flow and vortex shedding, spectral analysis of the waveforms received from the sensors can be used to model turbulence and improve flow meter accuracy during flowing conditions. Further processing can identify optimum flow model parameters. Further, because recorded perturbations at the pressure tap correlate to water-cut percentages in high-rate gas wells, this data can be used to mitigate the wet-gas overread error typical of pressure-differential flow meters in two-phase applications.

Analysis of sensed waveforms in accordance with the various embodiments of the invention can also increase performance and reduce risks associated with operation of wells. For instance, shut-in periods are often required to evaluate a well's remaining production potential. A temporary partial restriction of produced flow by an automatic choke can cause a back-pressure wave to propagate downhole, and the resulting waveform can be sensed and analyzed. The frequency and amplitude of the modulated wave correlates to fluid properties and the reservoir's natural pressure drive, so analysis of the waveform can provide a more accurate assessment of permeability than the nodal analysis results traditionally performed during well shut-in periods, while considerably reducing production downtime and associated risks. Waveform analysis can also detect potentially damaging vibrations such as the water-hammer affect and provide a basis for triggering a corrective response that can reduce these vibrations and avoid costly completion equipment and well bore damage without dramatically affecting production.

BRIEF DESCRIPTION OF THE DRAWINGS

Other objects and advantages of the invention may become apparent upon reading the following detailed description and upon reference to the accompanying drawings.

FIG. 6 is a flow diagram illustrating a method for initiating functions for controlling the flow of fluid in a conduit in accordance with one embodiment.

FIG. 7 is a flow diagram illustrating a method for transforming a plurality of sensor signals in accordance with one embodiment.

Figure 1:
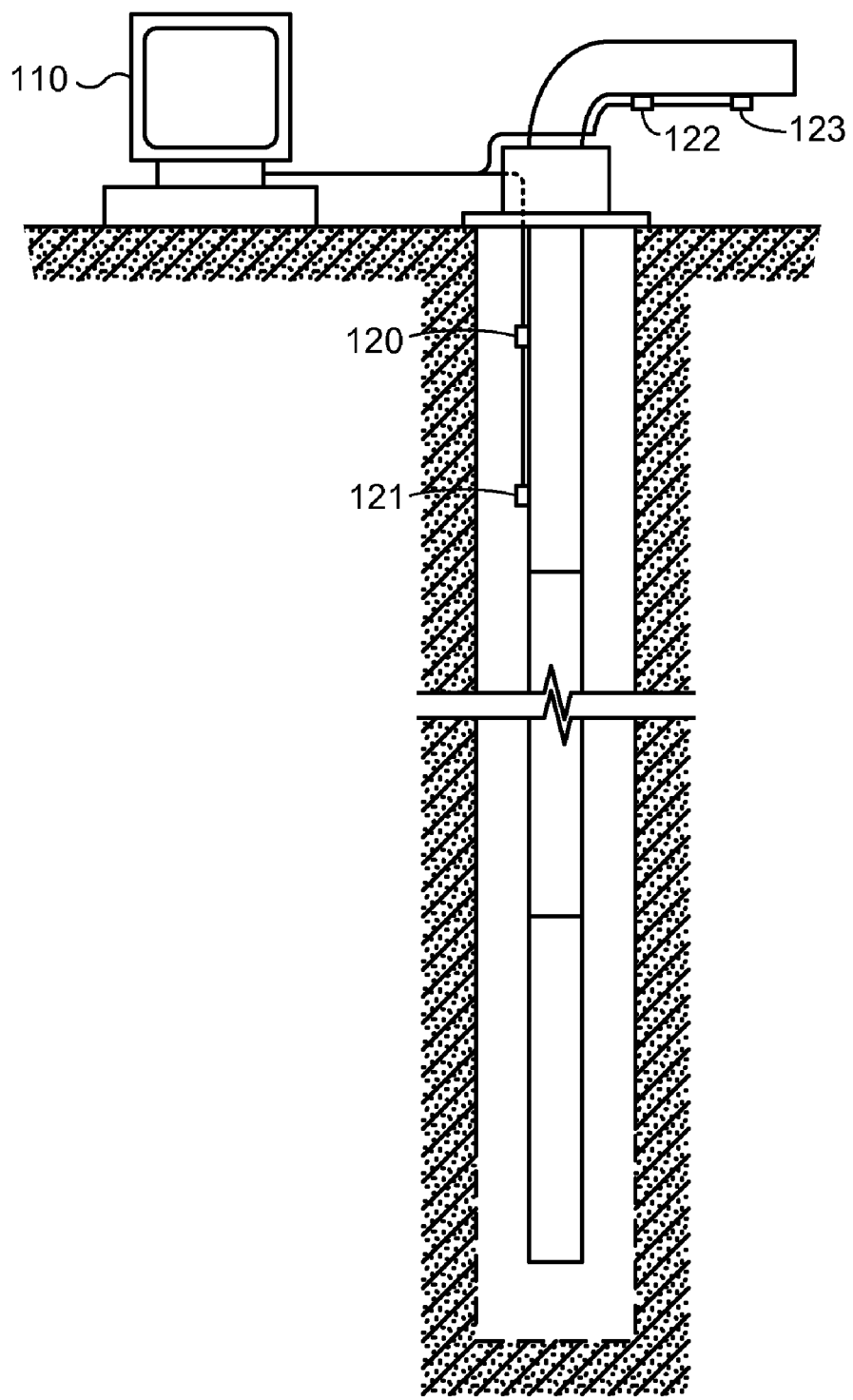
FIG. 1 is a diagram illustrating a system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for analysis of data associated with fluid flow through a conduit and potential control of the fluid flow. In one embodiment, a method includes a data processing unit obtaining from a sensor a signal representing a series of measurements of a physical parameter associated with fluid flow through the conduit. The data processing unit performs singular spectral analysis of this signal and thereby identifies recurring, possibly non-sinusoidal patterns in the signal. The data processing unit may construct a second signal from some or all of the recurring patterns identified in the first signal. Alternatively, the data processing unit may identify recurring patterns in the signal which are indicative of corresponding conditions associated with the fluid flow through the conduit. The data processing unit may then initiate control functions responsive to the recurring patterns and associated conditions.

Referring to FIG. 1, a diagram illustrating a system in accordance with one embodiment is shown. In this embodiment, a data processing system 110 is coupled to one or more sensors (e.g., 120-123) that provide data associated with a well. Data processing system 110 is configured to perform singular spectral analyses of the data in order to empirically identify patterns in the data that are associated with operating characteristics of the well or flow structures of the fluid flowing through the well. This information can then be used to manage the operation of the well.

As shown in FIG. 1, the system may utilize both downhole sensors (120, 121) and/or pipeline sensors (122, 123) to measure characteristics associated with the well. The measured characteristics may include, for example, the pressure of fluid flowing through the well or pipeline or the temperature of the fluid. Commonly, pressure measurements are used to determine pressure differentials between different points on the well, and these pressure differentials are used to calculate the rate of flow of fluid through the well. As discussed above, however, the accuracy of flow rate calculations may be affected by various flow structures, so data processing system 110 is configured to analyze the measured data, identifying these flow structures, and adjust the flow rate calculations to account for these flow structures and thereby improve the accuracy of the flow rate computation.

In addition to affecting flow rate computations, certain flow structures within the well may affect production equipment, or even the geological structure itself. For example, under certain conditions, vibrations of certain frequencies may resonate within the well, causing what is commonly referred to as the "water-hammer" effect. Water-hammer vibrations may have sufficient energy to cause damage to the equipment or geological structure of the well. Data processing system 110 may therefore be configured to identify conditions that may result in the water-hammer effect, and to adjust operation of the well (e.g., modify the setting of a choke) in order to change the well conditions and thereby reduce or eliminate damage resulting from the water-hammer effect.

Data processing system 110 may also be configured to simply improve the quality to data that is produced from the well in order to improve the analyses that result from this data. Often, measurements of downhole well conditions are taken at irregular intervals, and there may be substantial gaps in the data. Data processing system 110 may perform singular spectral analysis on the data to identify recurring patterns in the data. After these patterns are identified, the data can be reconstructed from the identified patterns to produce a less noisy signal, and to fill in gaps in the signal. After this smoothing and gap-filling process has been completed, subsequent analyses can be performed with greater accuracy.

Figure 2:
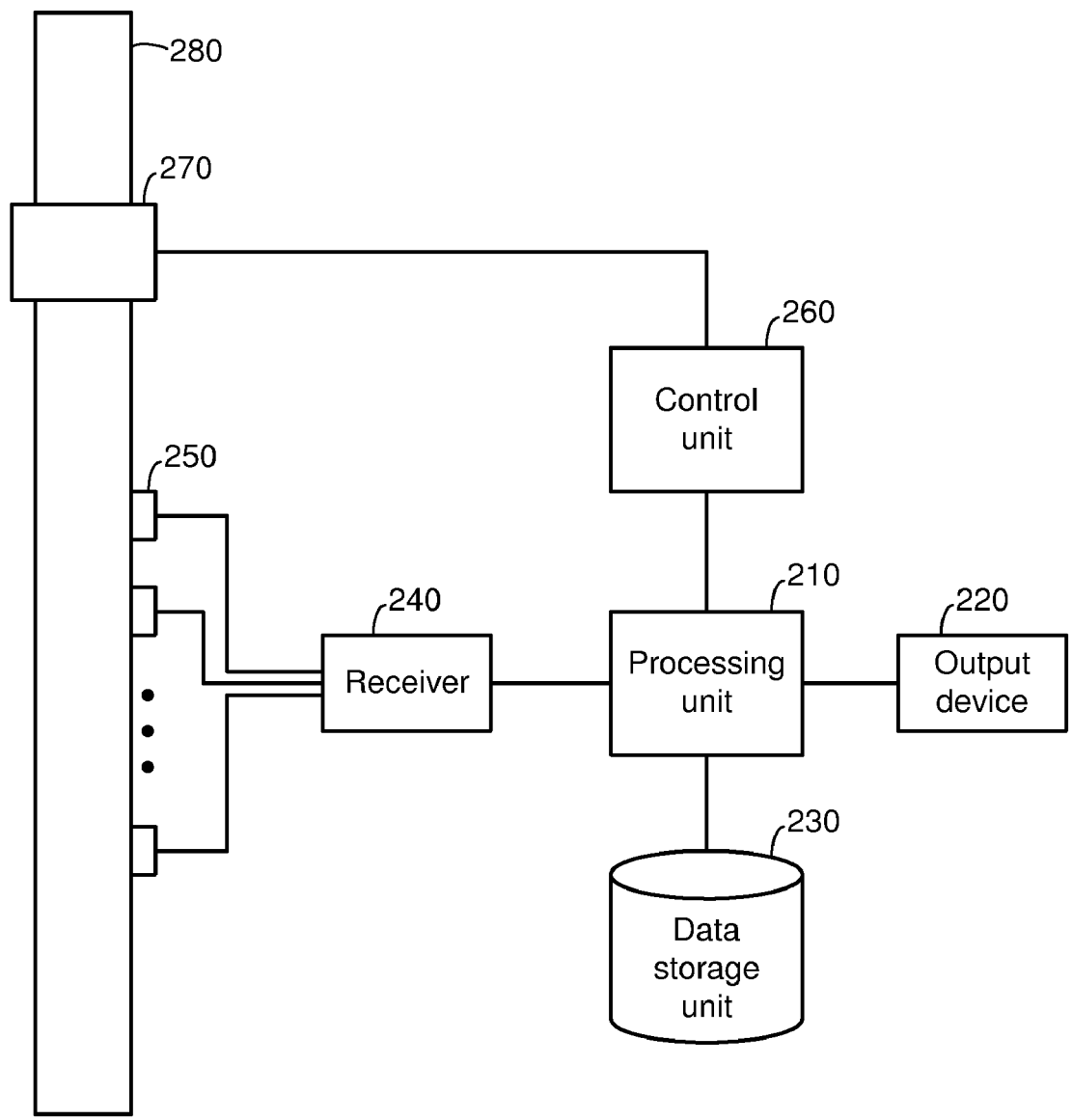
FIG. 2 is a functional block diagram illustrating a system in accordance with one embodiment.

Referring to FIG. 2, a functional block diagram illustrating a system in accordance with one embodiment is shown. The system includes a processing unit 210 that executes a software application which is configured to perform analysis and control functions. An I/O unit 220 is coupled to processing unit 210 to allow a user to interact with the system. I/O unit 220 may include, for example, a keyboard to allow the user to input commands, queries, control information, data or the like to processing unit 210. I/O unit 220 may include such output devices as monitors, printers, etc. to allow processing unit 210 to provide information to the user. I/O unit 220 may also include network interfaces, communication links or other means to communicate data to remotely located users or devices.

A data storage unit 230 is coupled to processing unit 210 in order to allow data, commands, applications or other information to be stored for use by the processing unit. Typically, downhole data or other well-related data that is received by processing unit 210 will be forwarded to data storage unit 230 for later analysis. Data storage unit 230 may include local memory, internal or external disk storage, network storage devices, or any other type of device suitable for storing data.

A sensor receiver 240 is coupled to processing unit 210 in this embodiment to provide an interface to one or more sensors (e.g., 250). The sensors measure physical characteristics associated with the well, such as temperature or pressure, and output corresponding electrical signals to receiver 240. Receiver 240 may digitize the received sensor signals as needed, and forward the digitized signals to processing unit 210. A control unit 260 is also coupled to processing unit 210 in this embodiment. Control unit 260 serves as an interface between processing unit 210 and a flow control device 270. Processing unit 210 may be configured to provide digital control signals to control unit 260, which may convert these signals as needed and provide them to flow control device 270 in order to adjust the settings of the flow control device and thereby adjust the flow of fluid through conduit 280 (e.g., a well or pipeline).

The present system is designed to obtain signals that represent measurement of physical characteristics associated with a well, and then identify patterns within these signals that are associated with conditions relevant to the operation of the well. When particular conditions are identified, the operation of the well can be adjusted to improve its performance, or the conditions can be taken into account when performing analyses related to operation of the well.

It should be noted that the present systems and methods can be used in connection with wells, pipelines or other conduits. For purposes of simplicity, references throughout this disclosure to "wells" should be construed to be equally applicable to pipelines and other types of conduits that are used to transport various types of fluids.

The system can be used in a variety of ways. For example, in one embodiment, the system may be designed to obtain a series of high-speed measurements of a physical characteristic using a single sensor, construct a signal corresponding to the physical characteristic as a function of time, and then perform one or more analyses of the signal to provide improved or enhanced information regarding operation of the well. These analyses may include singular spectral analysis to identify non-sinusoidal patterns in the signal which may be associated with flow structures or other operating conditions. The identified flow structures or operating conditions may, for example, allow more accurate computation of fluid flow rates or enable a greater understanding of the well's behavior. In another embodiment, measurements of the physical characteristic (or multiple characteristics) may be made using multiple sensors, and the signals derived from each sensor may be compared in order to perform such functions as reconstructing wavefronts of the characteristics as they pass the respective sensors. In yet another embodiment, data signals from one or more sensors may be monitored and analyzed to identify particular patterns that are associated with particular conditions that may or may not be desirable. The system may be configured to take particular actions that are associated with identified conditions in order to reduce unwanted conditions, or to enhance desirable conditions.

Figure 3:
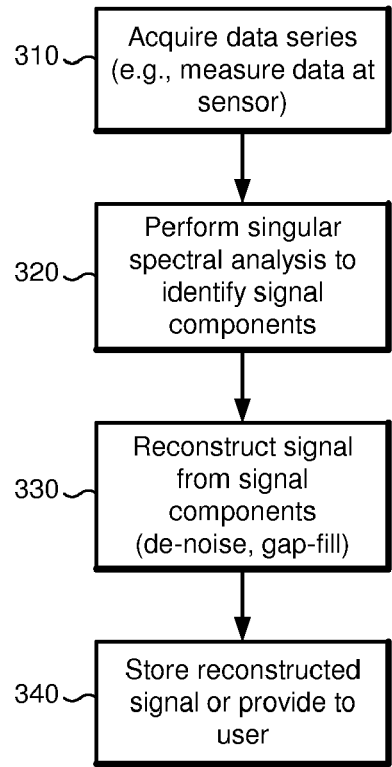
FIG. 3 is a flow diagram illustrating a method for transforming a sensor signal in accordance with one embodiment.

Referring to FIG. 3, a flow diagram illustrating a method in accordance with one embodiment is shown. In this embodiment, a series of data points representing a single signal for a physical parameter is first obtained (310). The data may be obtained, for example, by making a series of measurements of downhole data such as the pressure of the fluid flowing within a wellbore. The data may alternatively be retrieved from a data storage device, typically after having been measured by a sensor which is coupled to the well. The data is preferably obtained by sampling the desired parameter at a high rate (e.g., several samples per second) to provide greater temporal resolution.

Once the data has been acquired, singular spectral analysis is performed on the data to identify signal components that are repeated (320). Singular spectral analysis may also be referred to as empirical orthogonal function analysis or principal component analysis because it is designed to empirically identify the unique, orthogonal patterns or components that are repeated in the signal. Typically, singular spectral analysis is used to identify the components that have the greatest energy content first, followed by signal components that have decreasing energy content. The identification of signal components may continue until an arbitrary threshold for the respective energy content has been reached. An exemplary method for implementing singular spectral analysis will be described below with respect to FIG. 4.

After the components of the data signal have been identified, various actions can be taken. In this embodiment, substantially all of the signal components that are identified in the singular spectral analysis are used to reconstruct the original signal associated with the measured parameter (330). Because only the meaningful signal components are identified, however, the reconstructed signal does not include much of the noise that was present in the original signal. The reconstruction of the signal using the identified signal components therefore transforms the original signal to a de-noised signal. The de-noised signal can then be stored in a data storage unit for later use or analysis, or it can be presented to a user via, e.g., a display coupled to the system (340).

The reconstruction of the signal using the identified patterns may also "smooth" the data in the signal that is represented by the recurring patterns. Additionally, if the original data has gaps, these gaps can be filled with data according to the patterns that have been identified. In other words, if a particular pattern is found to occur at certain intervals, the pattern can be inserted into gaps at these known intervals. The smoothing and gap-filling of the data series may facilitate later examination and analysis and analysis by a user.

Signals such as pressure waveforms can provide the basis for analyses that may be used to model turbulence, identify multiphase flow structures, select optimum flow model parameters for more accurate flow rate calculations. Integral analysis methods based on the signals can mitigate wet-gas over-read errors and better quantify water-cut percentages. Pressure wave frequency and phase analysis can identify damaging vibration conditions such as the water-hammer effect, enabling a corrective response such as a partial choke change. Such corrective action can provide improved reservoir performance while avoids risks such as those associated with a complete well shut-in.

As an alternative to reconstructing the entire signal, signals that include only selected ones of the recurring patterns may be constructed. This allows the desired components of the signal to be examined in isolation. This may enable a user to identify details of the selected patterns, or to identify changes in the patterns over time (e.g., trends such as slowly increasing or decreasing magnitudes of the selected patterns).

Figure 4:
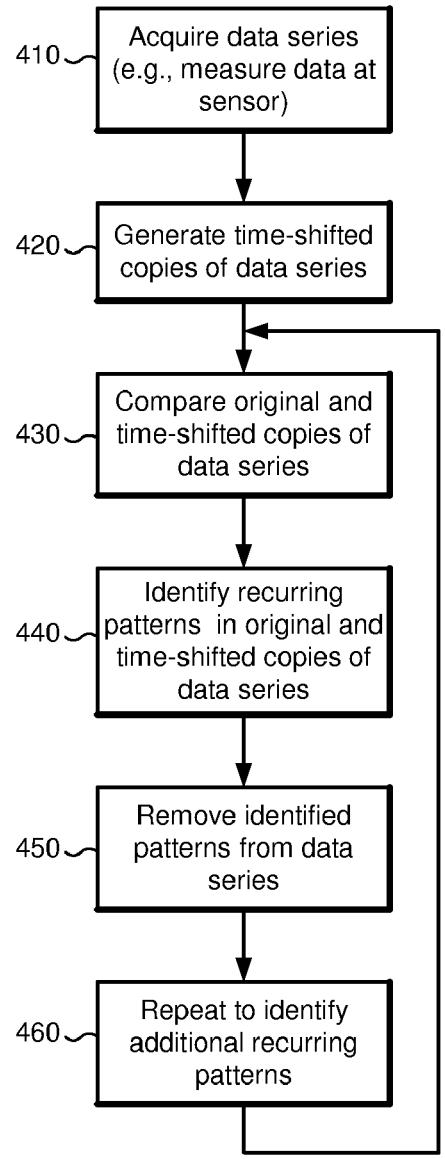
FIG. 4 is a flow diagram illustrating an exemplary method for performing singular spectral analysis in accordance with one embodiment.

Referring to FIG. 4, a flow diagram illustrating an exemplary method for performing singular spectral analysis is shown. As depicted in the figure, a data series (a signal) is acquired (410), such as by making a series of measurements or retrieving the data series from a data storage device. The data series is then copied and time-shifted (420). Assuming the data series represents measurements made at evenly spaced intervals, the time-shifting may simply comprise shifting each data point by one position in the series. The original data series is then compared to the time-shifted copies (430) to identify patterns that are repeated in the data series (440). These patterns may be trends, oscillations or other patterns. In one embodiment, a delay matrix is constructed and eigenfunctions are computed for the matrix. The process of identifying these recurring patterns is similar to identifying repeating sine/cosine waves of different frequencies as is performed in the more familiar Fourier analysis, but singular spectral analysis is not limited to sine/cosine waves, and may identify arbitrary patterns. In this embodiment, the recurring pattern having the highest energy content is identified, then this pattern is removed (450) and the process of comparing the original and time-shifted data series is repeated (460) to identify the recurring pattern having the next-highest energy content. This continues as necessary, typically until all patterns having greater than a threshold energy content are identified. In other embodiments, multiple patterns may be simultaneously identified and then sorted according to their respective energy content.

Figure 5:
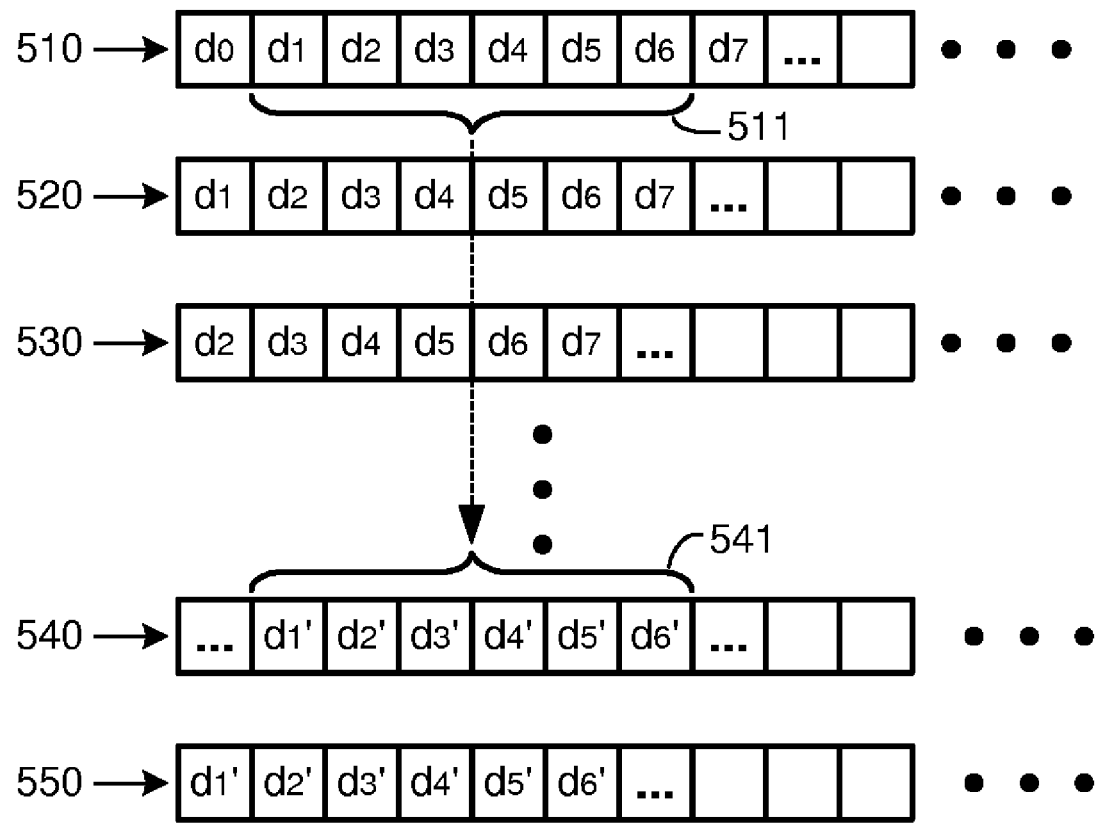
FIG. 5 is a diagram illustrating the time-shifting and comparison of a data series in accordance with one embodiment.

Referring to FIG. 5, the time-shifting and comparison of data series is shown graphically. FIG. 5 shows five data series. The uppermost data series (510) is the original data series consisting of data d0, d1, d2, d3, d4, d5, d6, d7, ... data series 520 is essentially identical to data series 510, but each value is shifted by one position. Data series 530 is shifted by two positions, and so on. After the time-shifted data series have been generated, the original data series is compared to each of the time-shifted data series to determine whether a pattern occurring in the original data series matches a pattern at the same position in one of the time-shifted data series. In the example of FIG. 5, it can be seen that data series 540 includes the sequence {d1', d2', d3', d4', d5', d6'} (541), which matches the sequence {d1, d2, d3, d4, d5, d6} (511) in the original data series. (The primes (') indicate that the values may not be exact matches for the values in the original data series.) Data series 550 is essentially identical to data series 540, but each value is shifted by one position. When this pattern is identified, it can be removed from each data series and the next pattern(s) can be identified.

It should be noted that singular spectral analysis is well known in the mathematical arts, so the mathematical details of implementing a singular spectral analysis algorithm will not be described in detail here.

Referring to FIG. 6, a flow diagram illustrating a method in accordance with an alternative embodiment is shown. In this embodiment, rather than transforming a data signal from its original, noisy form to a smooth, de-noised form, the system is configured to control the flow of fluid in the well based on the identified signal components. Similar to the method of FIG. 3, the method of FIG. 6 begins with the acquisition of the data series (610), such as by making measurements with a sensor, or by retrieving previously measured data from a storage device. Then, singular spectral analysis is performed on the signal to identify recurring components of the signal (620). In this embodiment, the identified signal components are then examined to determine whether any of these components are associated with known flow structures or other operating conditions of the well (630). Depending upon which conditions are identified (by identification of the corresponding signal components), a control function may be selected and performed to adjust operation of the well (640). For instance, if a signal component associated with a harmful condition such as water-hammer vibrations is identified, the system may automatically adjust a choke in the well in order to adjust the flow of fluid through the well and thereby reduce or eliminate this condition. The selection of appropriate control functions may be accomplished in various ways, such as by comparing identified patterns in the signal to a library of known patterns (e.g., a look-up table), or by determining whether the identified patterns meet more generalized criteria, such as a magnitude that increases to a level above a predetermined threshold. Many other criteria could be used as well.

Referring to FIG. 7, a flow diagram illustrating another alternative embodiment is shown. In this embodiment, multiple, different data signals are acquired (710). The different data signals are acquired from multiple sensors, rather than from a single sensor. The multiple data signals are then compared to each other to identify patterns within the signals that are the same (or nearly so) from one signal to the next (720). This comparison may be performed based upon the original data series from each sensor, or various analyses (e.g., singular spectral analysis) may be performed on the signals to improve their quality prior to the comparison, or to identify signal components that can be compared between signals. Based upon the occurrences of similar patterns in the different signals, the times at which these patterns occur in the different signals and the positions of the sensors that produced the signals, the wavefronts that caused the corresponding patterns in the signals can be reconstructed (730). These wavefronts can be stored for further analysis, displayed to a user, or used as the basis for initiating a control response to modify operation of the well (740).

Another alternative embodiment comprises a software program product comprising a computer-readable storage medium that contains one or more instructions that cause a computer (data processing unit) to perform a method as described above. The computer-readable storage medium may include any of a number of storage media, such as RAM, ROM, flash memory, EPROM memory, EEPROM memory, registers, hard disks, removable disks, CD-ROMs, optical media and so on. The instructions contained in the storage medium may be executable by any suitable type of data processing unit.

Those of skill will further appreciate that the various illustrative logical blocks, modules, circuits, and algorithm steps described in connection with the embodiments disclosed herein may be implemented as hardware, software (including firmware), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention. It should also be noted that the functions of the foregoing embodiments may be distributed among different functional blocks than those specifically described above, and many alternative arrangements will be apparent to those of skill in the art. Similarly, persons of skill in the field of the invention will recognize that the steps of the methods described above are exemplary, and alternative methods may redistribute, rearrange, or otherwise modify the functions implemented by the recited steps without departing from the scope of the invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for controlling fluid flow in a conduit comprising:
    a data processing unit receiving a series of measurements of a physical parameter associated with fluid flow through a conduit, wherein the series of measurements form a first signal for the physical parameter;
    the data processing unit generating one or more time-shifted copies of the first signal;
    the data processing unit comparing the first signal to the one or more time-shifted copies of the first signal;
    the data processing unit identifying one or more signal components that form recurring patterns in the first signal, wherein the recurring patterns include non-sinusoidal patterns; and
    the data processing unit communicating with a flow control unit in response to identifying the one or more signal components, wherein the flow control unit controls the fluid flow in the conduit in response to the communication from the data processing unit.

2. The method of claim 1, wherein obtaining the series of measurements comprises the data processing unit reading, at a plurality of intervals, an output of a sensor which is coupled to the conduit and is configured to measure the physical parameter.

3. The method of claim 1, wherein controlling the fluid flow in the conduit in response to the identified signal components comprises identifying one or more conditions that are associated with the identified signal components, selecting one or more actions that are associated with the one or more conditions, and performing the one or more selected actions to control the fluid flow in the conduit.

4. The method of claim 3, wherein the one or more selected actions comprise changing a flow rate of the fluid in the conduit.

5. The method of claim 4, wherein the one or more selected actions comprise changing a setting of a choke in the conduit.

6. A system for controlling fluid flow in a conduit comprising:
    a sensor coupled to the conduit and configured to measure the physical parameter, wherein the series of measurements form a first signal for the physical parameter;
    a data processing unit configured to
        receive the first signal and to generate one or more time-shifted copies of the first signal,
        compare the first signal to the one or more time-shifted copies of the first signal,
        identify one or more signal components that form recurring patterns in the first signal, wherein the recurring patterns include non-sinusoidal patterns, and
        select one or more control functions associated with the identified signal components; and
    a flow control unit coupled to the data processing unit and configured to perform the selected control functions.

7. The system of claim 6, wherein the data processing unit is configured to identify one or more conditions that are associated with the identified signal components and select the one or more control functions that will change the one or more identified conditions.

8. The system of claim 6, wherein the flow control unit comprises a choke in the conduit, wherein the selected control functions change a flow rate of the fluid in the conduit.

* * * * *